United States Patent

Ichikawa et al.

(10) Patent No.: US 6,933,440 B2
(45) Date of Patent: Aug. 23, 2005

(54) PROTECTOR

(75) Inventors: Hidehiro Ichikawa, Toyota (JP); Shigemi Hashizawa, Toyota (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/930,805

(22) Filed: Sep. 1, 2004

(65) Prior Publication Data

US 2005/0045357 A1 Mar. 3, 2005

(30) Foreign Application Priority Data

Sep. 2, 2003 (JP) ................................. P. 2003-309639

(51) Int. Cl.$^7$ ................................................ H02G 3/04
(52) U.S. Cl. ................... 174/48; 174/68.1; 174/68.3; 174/135; 248/68.1
(58) Field of Search ...................... 174/48, 49, 68.1, 174/68.3, 72 A, 97, 100, 135; 248/74.3, 68.1

(56) References Cited

U.S. PATENT DOCUMENTS 5,061,203 A * 10/1991 Allgood et al. ............. 439/441

FOREIGN PATENT DOCUMENTS

| JP | 55-161187 U | 11/1980 |
|---|---|---|
| JP | 57-75288 U | 5/1982 |
| JP | 3-48320 U | 5/1991 |
| JP | 6-77121 U | 10/1994 |
| JP | 11-234844 A | 8/1999 |
| JP | 2003-143734 A | 5/2003 |

* cited by examiner

*Primary Examiner*—Dhiru R. Patel
(74) *Attorney, Agent, or Firm*—Sughrue Mion, PLLC

(57) ABSTRACT

A protector includes a protector body which has a receiving portion for receiving at least one wire. A groove is formed on a bottom face of the receiving portion. The groove has a width smaller than a diameter of the wire.

11 Claims, 4 Drawing Sheets

PROTECTOR

BACKGROUND OF THE INVENTION

This invention relates to a protector which is mounted under a floor of a vehicle such for example as a hybrid car and an electric car, and has a shielding performance.

FIG. 4 shows one related protector.

A plurality of high-voltage wires 81 are collectively passed through a braid 90, so that this braid shields these high-voltage wires 81. A wire harness 80 is formed by the plurality of high-voltage wires 81 passing through the braid 90. The protector 50 is in the form of a container, and comprises a resin-molded base 60, and a resin-molded cover 70 attached to this resin-molded base 60. When the flattened elongate protector 50 is disposed generally horizontally, the base 60 is disposed at the upper side while the cover 70 is disposed at the lower side. In this specification, the definition of "upper and lower" will be given for the purpose of describing the protector.

The plurality of high-voltage wires 81, bundled together by the braid 90, are received in a receiving portion of the resin-molded base 60 of the protector 50. Thereafter, the upper-side resin-molded cover 70 is fitted on the lower-side resin-molded base 60, thus assembling the protector 50. Engagement portions (each in the form of a rectangular hole), provided at the cover 70, are engaged respectively with projection-like retaining portions 69 formed at the base 60, thereby attaching the cover 70 to the base 60. The wire harness 80, comprising the plurality of high-voltage wires 81 and the braid 90 (which shields the high-voltage wires 81, and bundles the high-voltage wires 81 together), is received in the protector 50 made of a synthetic resin.

Besides the above form of related protector, there is a related wire protector which has an electromagnetic shielding effect, and is lightweight, and is good in processability (see, for example, JP-A-2003-143734 (pages 1 and 2, FIGS. 1 to 6)).

Further, there is a related lightweight joint protector for shielded wires which is capable of shielding a joint portion between the shielded wires (see, for example, JP-UM-A-6-77121 (Pages 1 and 6, FIGS. 1 to 3 and 7)).

Further, there is a related cable-retaining device for a cable which is capable of retaining a cable with a simple construction, and is also capable of shielding the cable (see, for example, JP-UM-A-3-48320 (Page 5, FIG. 1)).

Further, there is a related protective tube for a pipe in a vehicle, in which even when a flipped stone strikes against the protective tube, this impact is hardly applied directly to the pipe, and a buffer performance is greatly enhanced, and a positioning operation is not necessary when mounting the protective tube (see, for example, JP-UM-A-57-75288 (Pages 1, 5 and 6, FIGS. 1 to 7)).

Further, there is a related support device for a wire harness or the like in which even when an impact and vibrations are applied from the exterior, a passing member will not abut against an inner wall of a closed cross-section, so that the generation of noises and damage to the passing member are eliminated (see, for example, JP-UM-A-55-161187 (page 2, FIGS. 1 and 2)).

Further, there is a related protector capable of fixing a bundle of wires without the use of an adhesive tape or the like (see, for example, JP-A-11-234844 (pages 1 and 2, FIGS. 1 to 5)).

However, when the above related protector 50 of FIG. 4 was mounted under a floor of a vehicle (not shown), mud and sand (not shown) occasionally intruded into the protector 50 during the travel of the vehicle (not shown). And besides, there were occasions when the mud and sand which intruded into the protector 50 reached the inner side of the braid 90 through meshes 91 of this braid 90.

When the vehicle (not shown), having the protector 50 mounted thereon, is subjected to vibration, friction develops between the wires 81 and the braid 90. In such a case, when much mud and sand were interposed between each wire 81 and the braid 90, one or both of the wire 81 and the braid 90 were often worn by the mud and sand. And besides, in case much mud and sand were interposed between the braid 90 and the protector 50, one or both of the braid 90 and the protector 50 were often worn by the mud and sand when the vehicle (not shown), having the protector 50 mounted thereon, was subjected to vibration. Thus, the wires 81, the braid 90 and the protector 50 were worn by the mud and sand which intruded into the protector 50, and these parts were deteriorated, and this has been a problem.

SUMMARY OF THE INVENTION

In view of the foregoing, it is an object of this invention to provide a protector which will not allow wires and others to be worn, and has excellent shielding characteristics.

In order to achieve the above object, according to the present invention, there is provided a protector, comprising:

a protector body, which has a receiving portion for receiving at least one wire, wherein a groove is formed on a bottom face of the receiving portion; and wherein the groove has a width smaller than a diameter of the wire.

Preferably, the protector body is comprised of a metal material.

With this construction, mud and sand, intruding into the protector, are caused to drop into the groove in the protector body, thereby preventing the mud and sand from being held between the wire and the protector body. Therefore, the wire is prevented from being worn to an abnormal level by the mud and sand. And besides, the protector body is formed, using the metal material, and therefore the shielding performance of the protector is enhanced. Furthermore, the protector body is made of the metal material, and therefore the protector is prevented from being damaged when a stone or the like, flipped by the vehicle during the travel of the vehicle, strikes against the protector.

Preferably, a linear contact portion on which the wire is placed is formed on the bottom face. The linear contact portion linear contacts the wire.

With this construction, mud and sand are less liable to deposit on the upper side of the groove in the protector body. Therefore, a wear resistance of the wire, disposed at the upper side of the groove, is enhanced.

Preferably, the linear contact portions has a curbed shape.

With this construction, mud and sand are much less liable to deposit on the upper side of the groove in the protector body. Therefore, the wear resistance of the wire, disposed at the upper side of the groove in the protector body, is further enhanced.

Preferably, the at least one wire is a plurality of wires which are bundled together to form a wire harness. The wires are received in a receiving portion of the protector body.

With this construction, for bundling the plurality of wires into the wire harness, the wires are received in the receiving portion of the protector body, so that the wire harness is formed. Therefore, the wire harness can be easily formed.

Preferably, the protector further comprising a cover which is attached to the protector body. The cover is comprised of a metal material.

With this construction, the shielding performance of the protector is enhanced. And besides, the cover is attached to the protector body receiving the plurality of wires therein, and therefore the wires will not be separated from one another, and are positively kept in a bundled condition.

Preferably, the protector body has a first slide portion. The cover has a second slide portion which is situated so as to correspond to the first slide portion. When the cover is attached to the protector body, the cover is slidably movable to the protector body through the first and second slide portions.

With this construction, the cover can be easily attached to the protector body.

Preferably, the first slide portion has a convex portion, and extends in a longitudinal direction of the protector body. The second slide portion has a concave portion, and extends in a longitudinal direction of the cover.

With this construction, the protector body can be easily produced. Also, the cover can be easily produced. And, the cover can be easily attached to the protector body.

Preferably, the groove extends in a longitudinal direction of the protector body.

Preferably, an external face of the protector body corresponding to the bottom face of the receiving portion has a corrugated shape.

BRIEF DESCRIPTION OF THE DRAWINGS

The above objects and advantages of the present invention will become more apparent by describing in detail preferred exemplary embodiments thereof with reference to the accompanying drawings, wherein:

FIG. 2A is a front-elevational view showing a protector body, and FIG. 2B is a conceptual view showing a bottom of the protector body:

FIG. 3A is a front-elevational view showing a protector body, and FIG. 3B is a conceptual view showing a bottom of the protector body.

DETAILED DESCRIPTION OF THE PREFERRED EMBODIMENTS

A preferred embodiment of a protector of the present invention will now be described in detail with reference to the drawings.

[First Embodiment]

Figure 1:
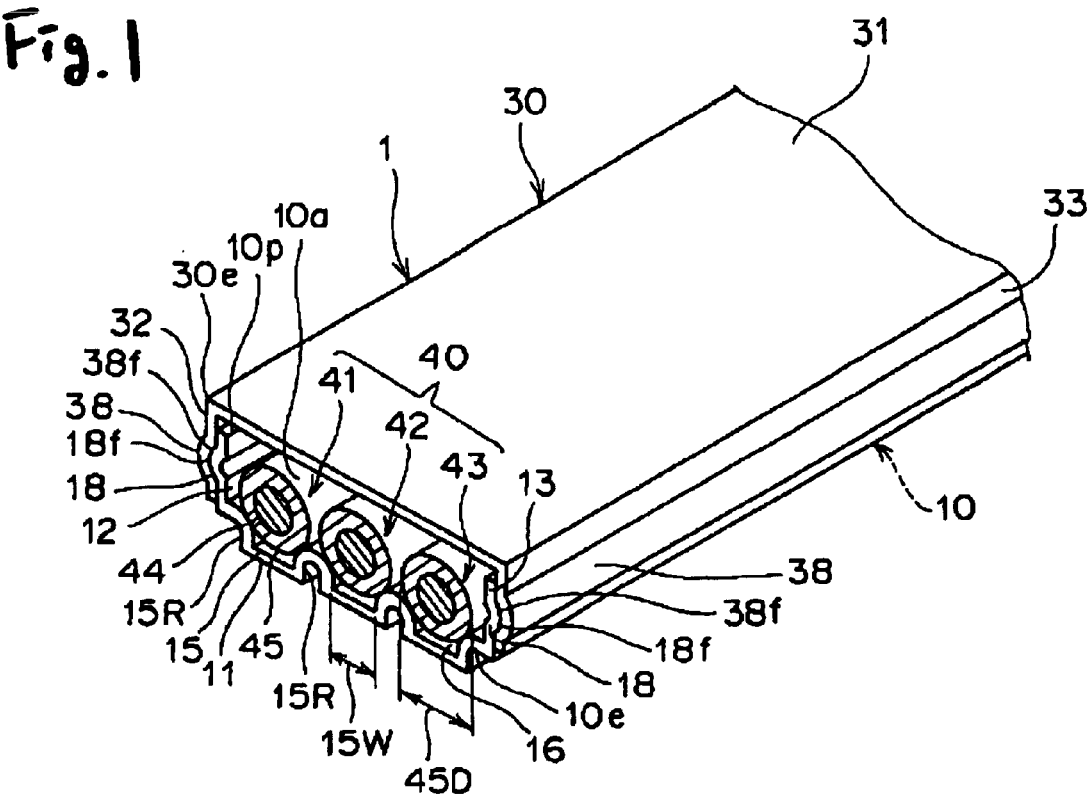
FIG. 1 is a perspective view showing a first embodiment of a protector of the present invention.
Figure 2A:
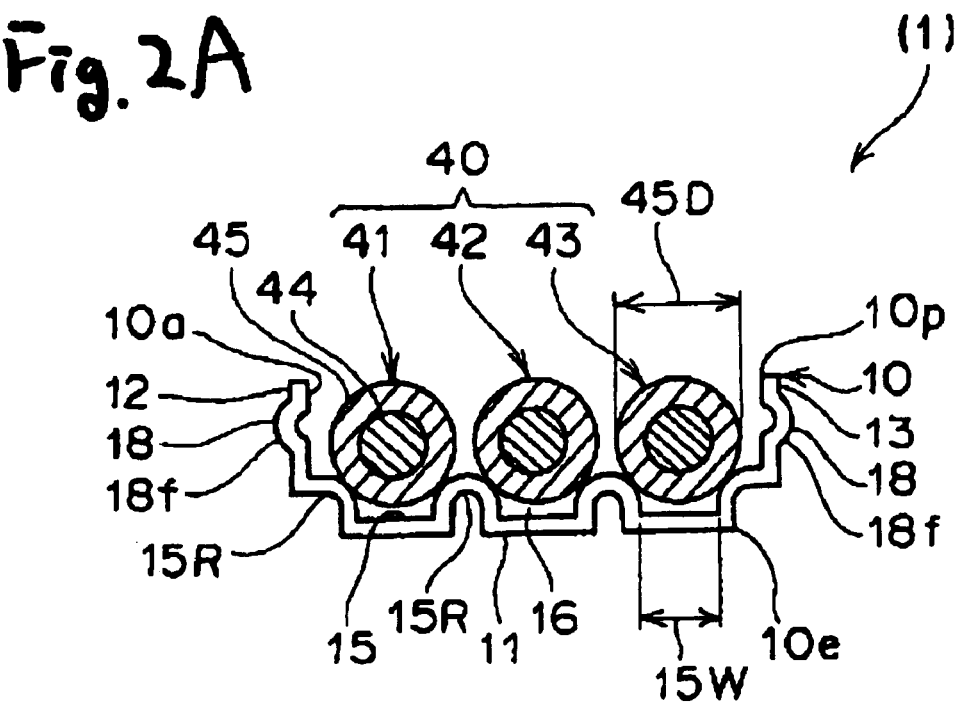
FIGS. 2A and 2B show the protector of the first embodiment.
Figure 2B:
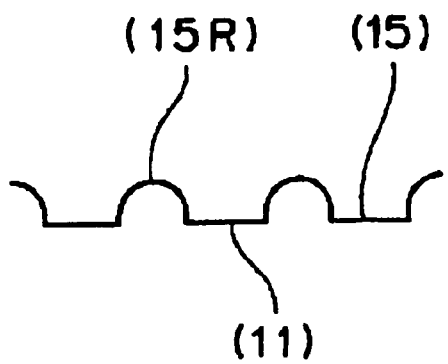

FIG. 1 is a perspective view showing the first embodiment of the protector of the invention, FIGS. 2A and 2B show the protector of the first embodiment, and FIG. 2A is a front-elevational view showing a protector body, and FIG. 2B is a conceptual view showing a bottom of the protector body.

The definition of "upper and lower directions" is the same as given in the Section of "Background Art", and therefore detailed explanation thereof will be omitted here.

A plurality of high-voltage wires 41, 42 and 43 are received in the protector 1 shown in FIGS. 1 and 2A, and then this protector is mounted under a floor of a vehicle (not shown) such for example as a hybrid car and an electric car. The term "hybrid car" means an automobile which is capable of running, utilizing a plurality of power sources. One example of such hybrid cars is an automobile having a combination of a gasoline engine and an electric motor. One example of electric cars is an automobile using electricity, produced from a fuel cell, as a power source. The protector is used as a shield protector which is to be mounted under a floor of a vehicle such as an electric car and a hybrid car which can run, using electricity as a power source. In addition to the wires, other wire-like members can be received in the protector.

As shown in FIGS. 1 and 2A, an elongate insulating covering 45 of a generally cylindrical cross-section (which is made of a synthetic polymer) is formed around an elongate metal conductor 44 of a generally round cross-section (which is made of copper, aluminum or the like), and by doing so, each of the high-voltage wires 41, 42 and 43 is formed. There is used the protector body 10 forming the protector 1, and the wires 41, 42 and 43 are bundled together by the protector body 10 to form a wire harness 40. The protector body 10, forming the wires into the wire harness 40, is made of a metal material having sufficient rigidity. For example, an aluminum material which is more lightweight than an iron material was used as the metal material. Examples of such aluminum materials include various aluminum alloys.

The protector body 10 is in the form of a metallic base 10 including a bottom wall 11 of a generally corrugated cross-section and opposite side walls 12 and 13 extending upwardly from the bottom wall 11. As shown in FIG. 2B, the bottom wall 11 of the protector body 10 has a plurality of linear contact (or line-contact) portions 15R of a generally semi-circular cross-section. As shown in FIGS. 1 and 2A, grooves 15 are formed on the bottom wall 11 of the protector body 10, and a width 15W of each groove 15 is smaller than a diameter 45D of each of the wires 41, 42 and 43 which are to be received in the protector body 10. The wires 41, 42 and 43 are introduced into a receiving portion 10a of the protector body 10 through an upper opening 10P of the protector body 10, and are installed in this receiving portion 10a. At this time, a space 16 is formed between the generally cross-sectionally corrugated bottom wall 11 of the protector body 10 and each of the wires 41, 42 and 43.

The protector 1, having the wires 41, 42 and 43 received in the protector body 10, is mounted under the floor of the vehicle, and in this case mud and sand (not shown), intruding into the protector 1, are caused to drop into the grooves 15 formed in the bottom wall 11 of the protector body 10. Mud and sand, intruding into the receiving portion 10a of the protector 1, are caused to drop into the spaces 16 each formed by the corresponding one of the wires 41, 42 and 43 (forming the wire harness 40) and the corresponding linear contact portions 15R of a generally semi-circular cross-section formed at the bottom wall 11 of the protector body 10.

Therefore, there is avoided a situation in which the wires 41, 42 and 43 are kept in frictional contact with the mud and sand for a long period of time. Therefore, there is prevented a situation in which much mud and sand are held between each wires 41, 42 and 43 and the protector body 10, so that one or both of the insulating covering 45 of each wire 41, 42 and 43 and the bottom wall 11 of the protector body 10 are worn to be deteriorated.

For example, when the vehicle (not shown) is used for a long period of time, vibration is imparted to the vehicle for a long time. When vibration is applied to the wires, lying on much mud and sand, for a long time, there is a fear that the insulating coverings of the wires are worn to an abnormal level by the mud and sand, so that part of the conductor of each wire is exposed, and a high-voltage current, flowing through the conductor leaks, thus causing short-circuiting.

However, when the narrow grooves 15, each having the width 15W smaller than the diameter 45D of the wires 41, 42 and 43 (which are to be received in the protector body 10), are formed on the bottom wall 11 of the protector body 10, troubles such as the above short-circuiting, are prevented. When the protector 1 is mounted under the floor of the vehicle (not shown), there is hardly encountered a situation in which the amount of wear of the insulating covering 45 of each wire 41, 42, 43 greatly increased.

Figure 4:
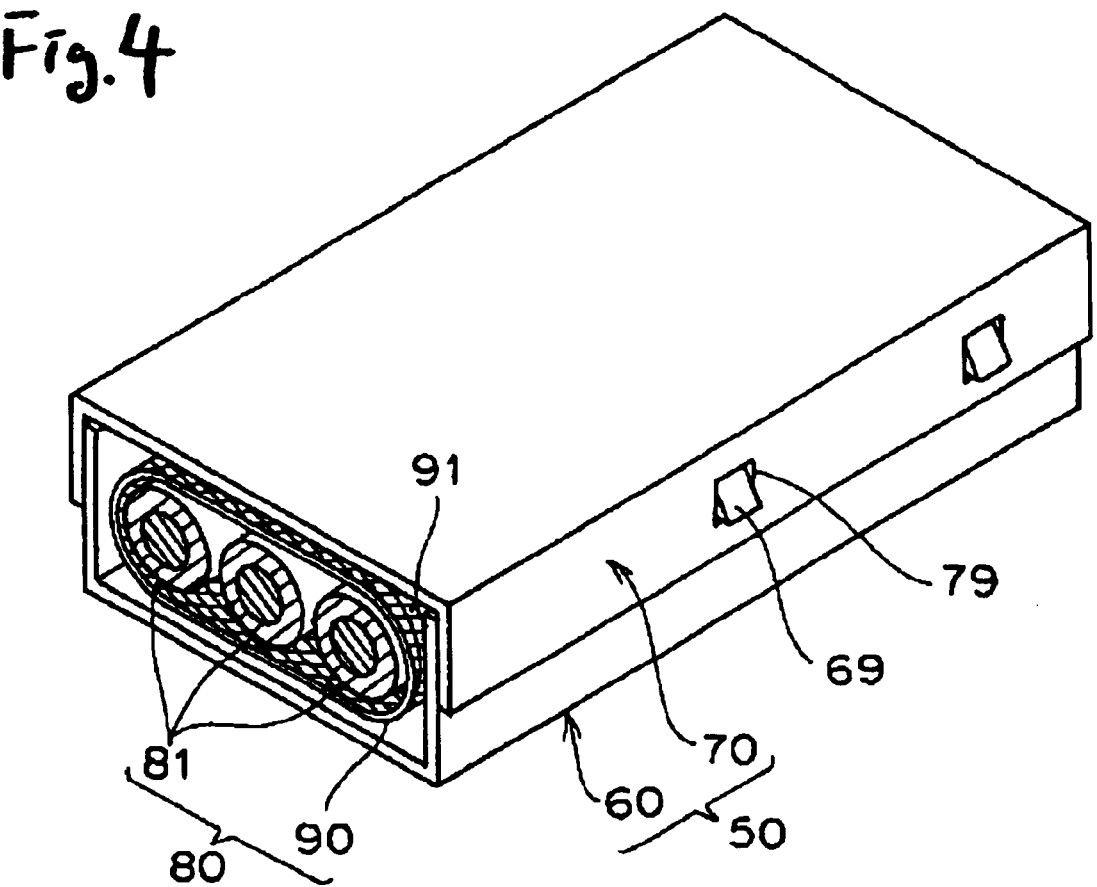
FIG. 4 is a perspective view showing one related protector.

The protector body 10 is made of the metal material, and therefore shielding characteristics of the protector 1 (FIG. 1 and FIG. 2A) are more enhanced as compared with the shielding characteristics of the related braid 90 (FIG. 4). And besides, the protector body 10 is made of the metal material having sufficient rigidity, and therefore the protector 1 is positively prevented from being easily damaged when a stone (not shown) or the like, flipped by a tire of the vehicle (not show) during the travel of the vehicle, strikes against the protector 1. Therefore, the protector 1 continues to positively protect the wires 41, 42 and 43.

As shown in FIGS. 1 and 2A, the pair of linear contact portions 15R on which the corresponding wire 41, 42, 43 can be placed in linear contact relation thereto are provided at the upper side of each of the grooves 15 formed in the bottom wall 11 of the protector body 10. Each of the linear contact portions 15R is formed into an arcuate shape so that each of the wires 41, 42 and 43 can be held in linear contact with the protector body 10. The linear contact portions 15R are such that each wire 41, 42, 43 can be placed on the corresponding pair of linear contact portions 15R in linear contact relation thereto, and each linear contact portion 15R is formed as a curved portion 15 of a generally semi-circular cross-section so that the wires 41, 42 and 43 will not be damaged.

When the curved portions 15R of an arcuate shape are formed at the upper side of each groove 15 in the bottom wall 11, mud and sand, intruding into the protector 1, are less liable to deposit on the upper side of each groove 15 in the protector body 10. Therefore, the resistance of the wires 41, 42 and 43 (placed respectively at the upper sides of the grooves 15 formed in the protector body 10) to wear is enhanced. And besides, each of the wires 41, 42 and 43 is supported on the upper sides of the curved portions 15R of the corresponding groove 15 in the bottom wall 11 of the protector body 10, and therefore the insulating coverings 45 of the wires 41, 42 and 43 are easily prevented from damage as compared, for example, with the case where the insulating coverings 45 of the wires 41, 42 and 43 are supported on angular corners.

As shown in FIGS. 1 and 2A, the plurality of wires 41, 42 and 43 are bundled together to form the wire harness 40. The high-voltage wires 41, 42 and 43, forming the wire harness 40, are received in the receiving chamber 10a of the protector body 10, and are juxtaposed at generally equal intervals.

For bundling the plurality of wires 41, 42 and 43 into the wire harness 40, these wires 41, 42 and 43 are received in the receiving chamber 10a of the protector body 10, so that theses wires form the wire harness 40. The protector 1 serves to bundle the plurality of wires 41, 42 and 43 into the wire harness 40. Therefore, the single wire harness 40 can be easily and rapidly formed by the use of the protector 1.

Like the protector body 10, a cover 30 (FIG. 1) to be attached to the protector body 10 shown in FIGS. 1 and 2A is made of a metal material such as aluminum. The protector body 10 (FIGS. 1 and 2A) and the cover 30 (FIG. 1) are made of the same metal material. The cover 30 includes a flat plate-like base wall 31, and a pair of side walls 32 and 33 extending generally perpendicularly downwardly from the base wall 31. As shown in FIG. 1, the protector 1 is in the form of a metallic container including the metallic base 10 and the metallic cover 30 attached to the metallic base 10. The upper-side metallic cover 30 is fitted on the lower-side metallic base 10. The shield protector 1, illustrated in FIG. 1, is made only of the metal material (such as an aluminum alloy) having sufficient rigidity.

For example, when an aluminum material is used to form the protector body 10 and cover 30 of the protector 1, the vehicle weight of the automobile (not shown) is prevented from increasing extremely. The density of an aluminum alloy is about 2.8 g/cm$^3$. The density of a steel is about 7.8 g/cm$^3$. The density of a copper alloy is about 8.9 g/cm$^3$. For example, a magnesium alloy, having a density of about 1.7 g/cm$^3$, has also been announced. Thus, light alloys such as an aluminum alloy are lightweight metal materials. The lightweight metal material, used to form the protector body and the cover, has, for example, a density of from above 0 to 2.8 g/cm$^3$, and preferably a density of 1.7 g/cm$^3$ to 2.8 g/cm$^3$. By using such a metal material, the vehicle (not shown) can be made lightweight.

The protector body 10 and the cover 30 are formed, using the metal material such as an aluminum alloy, and therefore the shielding characteristics of the protector 1 are further enhanced. The plurality of wires 41, 42 and 43 are received in the metallic protector 1, so that these high-voltage wires 41, 42 and 43 are shielded, and electric fields inside and outside the protector 1 are easily intercepted. When the metallic protector 1 is grounded to a metallic vehicle body (not shown) or other, the satisfactory shielding effect is achieved.

The protector body 10 and the cover 30 are formed, using the metal material such as an aluminum alloy, and the high-voltage wires 41, 42 and 43 are shielded by these parts, and therefore the provision of the braid 90 of the wire harness 80, installed in the related protector 50 (FIG. 4), can be omitted. By thus omitting the use of the braid 90, the cost of the wire harness can be reduced. The wire harness 40, shown in FIG. 1, has a smaller number of component parts as compared with the related wire harness 80 including the wires 81 such as cables installed under the floor of the vehicle, and therefore this wire harness 40 is an inexpensive harness assembly. And besides, the use of the braid 90 in the wire harness is omitted, and therefore troubles, such as wear of the braid 90 by mud and sand, are not encountered.

As shown in FIG. 1, the cover 30 is attached to the protector body 10 receiving the plurality of wires 41, 42 and 43 therein, and therefore the wires 41, 42 and 43 will not be separated from one another, and are positively kept in a bundled condition.

As shown in FIGS. 1 and 2A, a pair of slide portions 18 for sliding contact purposes are formed at the protector body 10. As shown in FIG. 1, a pair of slide portions 38 for sliding contact purposes, corresponding respectively to the slide portions 18, are formed at the cover 30 which is to be attached to the protector body 10. The slide portions 38 of the cover 30 (FIG. 1) are fitted respectively on the slide portions 18 of the protector body 10, so that the cover 30 is slidably attached to the protector body 10.

The slide portions 18 are formed at the protector body 10, and therefore the cover 30 can be easily attached to the protector body 10. The protector body 10 and the cover 30 are fitted together in such a manner that the two can be slid relative to each other, and therefore when disassembling the automobile (not shown) (such as a hybrid car and an electric car) for recycling purposes, the protector 1 can be easily removed from the vehicle body of the automobile, and can be disassembled. Therefore, the protectors 1 which facilitate a recycling operation of automobiles are provided to car parts-assembling companies and others.

The elongate slide portions 18, formed respectively at the opposite side walls 12 and 13 of the protector body 10, extend in the direction of the length of the elongate protector body 10, and each of the slide portions 18 is formed as a convex portion 18 of a generally curved cross-section. The elongate slide portions 38, formed respectively at the opposite side walls 32 and 33 of the elongate cover 30, extend in the direction of the length of the elongate cover 30, and each of the slide portions 38 is formed as a concave portion 38 of a generally curved cross-section.

The slide portions 18 of the above shape are formed at the protector body 10, and therefore the protector bodies 10 can be efficiently formed in a continuous manner by extrusion or the like at the time of producing the protector bodies 10. The slide portions 38 of the above shape are formed at the cover 30, and therefore the covers 30 can be efficiently formed in a continuous manner by extrusion or the like at the time of producing the covers 30.

Therefore, a labor cost and others are reduced when producing the protector bodies 10 and the covers 30, and the shield protectors 1, each having the inexpensive protector body 10 and the corresponding cover 30, can be provided to car parts-assembling companies and others. Also, in accordance with a design specification of the protector 1 or others, inexpensive protector bodies 10 are provided to car parts-assembling companies and others. The protector body 10 and the cover 30 are both formed, using a material which can be extruded.

The slide portions 18 are formed at the protector body 10, while the slide portions 38, corresponding respectively to the slide portions 18, are formed at the cover 30, and therefore the operation for attaching the cover 30 to the protector body 10 can be effected easily. And besides, a seal between the protector body 10 and the cover 30 is enhanced by the slide portions 18 of the protector body 10 and the slide portions 38 of the cover 30. Therefore, mud and sand are less liable to intrude into the protector 1.

The process of attaching the cover 30 to the protector body 10 will be described. One end portion 10e of the protector body 10 and the other end portion of the cover 30 are mated with each other. That end portion of the cover 30 remote from one end portion 30e thereof in the longitudinal direction is the other end portion of the cover 30. The cover 30 is slid relative to the protector body 10 in the longitudinal direction, and the protector body 10 and the cover 30 are fitted together in such a manner that the one end portion 10e of the protector body 10 and the one end portion 30e of the cover 30 are disposed in a common plane, and by doing so, the cover 30 is attached to the protector body 10.

At this time, inner surfaces 38f of the cross-sectionally-curved slide portions 38 (which extend respectively from the side walls 32 and 33 of the cover 30 (FIG. 1), and also extend in the longitudinal direction of the cover 30) slide in contact respectively with outer surfaces 18f (FIG. 2A) of the cross-sectionally-curved slide portions 18 which extend respectively from the side walls 12 and 13 of the protector body 10, and also extend in the longitudinal direction of the protector body 10. In this manner, the protector 1 is assembled.

When the protector body 10 as well as the cover 30 is formed into the generally linear shape as shown in FIG. 1, the above attaching method is effective. In accordance with a design specification of the protector 1 or others, there can be used the type of protector in which a cover 30 is attached to a protector body 10 from the upper side.

[Second Embodiment]

Figure 3A:
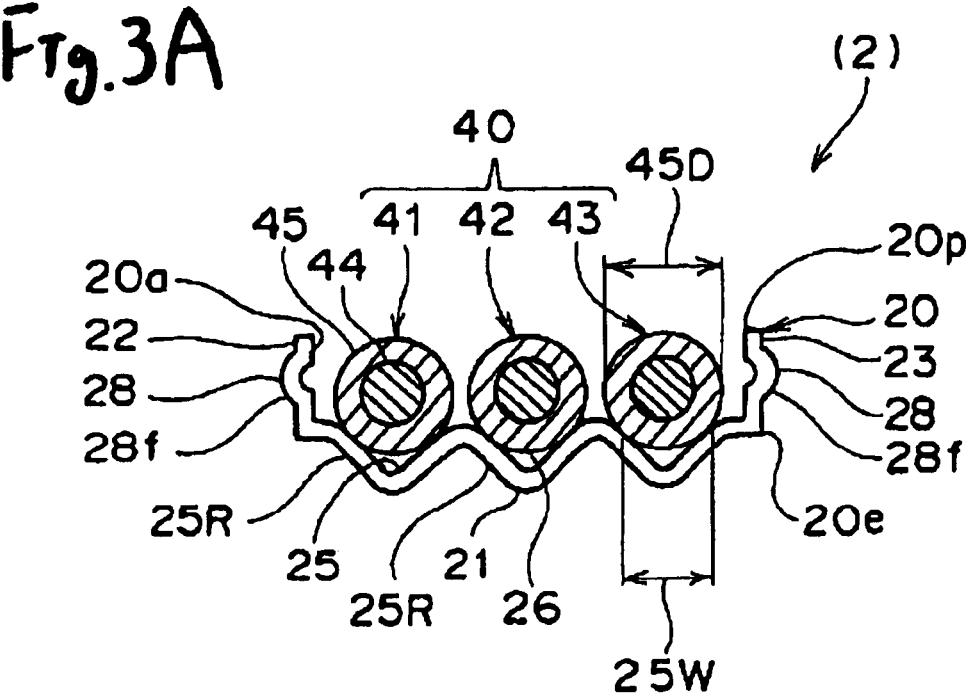
FIGS. 3A and 3B show a second embodiment of a protector of the invention.
Figure 3B:
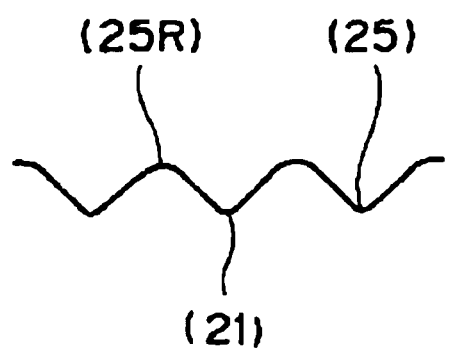

FIGS. 3A and 3B show a second embodiment of a protector of the invention, and FIG. 3A is a front-elevational view showing a protector body, and FIG. 3B is a conceptual view showing a bottom of the protector body.

The protector body 10 of FIGS. 1 and 2A and the protector body 20 of FIG. 3A have generally the same configuration except that their bottom walls 11 and 21 are different in shape from each other. With respect to those portions of the second embodiment identical to those of the first embodiment, only important portions thereof will be described, and detailed description thereof will be omitted.

A plurality of high-voltage wires 41, 42 and 43 are received in the protector 2 shown in FIG. 3A, and then this protector is mounted under a floor of a vehicle (not shown) such for example as a hybrid car and an electric car. There is used the protector body 20 forming the protector 2, and the wires 41, 42 and 43 are bundled together by the protector body 20 to form a wire harness 40. The protector body 20, forming the wires into the wire harness 40, is made of a metal material having sufficient rigidity. For example, an aluminum material was used as the metal material.

The protector body 20 is in the form of a metallic base 20 including the bottom wall 21 of a generally corrugated cross-section and opposite side walls 22 and 23 extending upwardly from the bottom wall 21. As shown in FIG. 3B, the bottom wall 21 of the protector body 20 has a plurality of linear contact (or line-contact) portions 25R of a generally wavy cross-section. As shown in FIG. 3A, grooves 25 are formed in the bottom wall 21 of the protector body 20, and a width 25W of each groove 25 is smaller than a diameter 45D of each of the wires 41, 42 and 43 which are to be received in the protector body 20. The wires 41, 42 and 43 are introduced into a receiving portion 20a of the protector body 20 through an upper opening 20P of the protector body 20, and are installed in this receiving portion 20a. At this time, a space 26 is formed between the generally cross-sectionally corrugated bottom wall 21 of the protector body 20 and each of the wires 41, 42 and 43.

The protector 2, having the wires 41, 42 and 43 received in the protector body 20, is mounted under the floor of the vehicle, and in this case mud and sand (not shown), intruding into the protector 2, are caused to drop into the grooves 25 formed in the bottom wall 21 of the protector body 20. Mud and sand, intruding into the receiving portion 20a of the protector 2, are caused to drop into the spaces 26 each formed by the corresponding one of the wires 41, 42 and 43 (forming the wire harness 40) and the corresponding linear contact portions 25R of a generally wavy cross-section formed at the bottom wall 21 of the protector body 20.

Therefore, there is avoided a situation in which the wires 41, 42 and 43 are kept in frictional contact with the mud and sand for a long period of time. Therefore, there is prevented a situation in which much mud and sand are held between each wires 41, 42 and 43 and the protector body 20, so that one or both of an insulating covering 45 of each wire 41, 42 and 43 and the bottom wall 21 of the protector body 20 are worn to be deteriorated. When the protector 2 was mounted under the floor of the vehicle (not shown), there was hardly encountered a situation in which the amount of wear of the insulating covering 45 of each wire 41, 42, 43 greatly increased, thus inviting the above troubles.

The protector body 20 is made of the metal material, and therefore shielding characteristics of the protector 2 (FIG. 3A) are more enhanced as compared with the shielding characteristics of the related braid 90 (FIG. 4). And besides, the protector body 20 is made of the metal material having sufficient rigidity, and therefore the protector 2 is positively prevented from being easily damaged when a stone (not shown) or the like, flipped by a tire of the vehicle (not show) during the travel of the vehicle, strikes against the protector 2. Therefore, the protector 2 continues to positively protect the wires 41, 42 and 43.

As shown in FIG. 3A, the pair of linear contact portions 25R on which the corresponding wire 41, 42, 43 can be placed in linear contact relation thereto are provided at the upper side of each of the grooves 25 formed in the bottom wall 21 of the protector body 20. Each of the linear contact portions 25R is formed into an arcuate shape so that each of the wires 41, 42 and 43 can be held in linear contact with the protector body 20. The linear contact portions 25R are such that each wire 41, 42, 43 can be placed on the corresponding pair of linear contact portions 25R in linear contact relation thereto, and each linear contact portion 25R is formed as a curved portion 25 of a generally wavy cross-section so that the wires 41, 42 and 43 will not be damaged.

When the curved portions 25R of an arcuate shape are formed at the upper side of each groove 25 in the bottom wall 21, mud and sand, intruding into the protector 2, are less liable to deposit on the upper side of each groove 25 in the protector body 20. Therefore, the resistance of the wires 41, 42 and 43 (placed respectively at the upper sides of the grooves 25 formed in the protector body 20) to wear is enhanced. And besides, each of the wires 41, 42 and 43 is supported on the upper sides of the curved portions 25R of the corresponding groove 25 in the bottom wall 21 of the protector body 20, and therefore the insulating coverings 45 of the wires 41, 42 and 43 are more positively prevented from damage as compared, for example, with the case where the insulating coverings 45 of the wires 41, 42 and 43 are supported on angular corners.

As shown in FIG. 3A, the plurality of wires 41, 42 and 43 are bundled together to form the wire harness 40. The high-voltage wires 41, 42 and 43, forming the wire harness 40, are received in the receiving chamber 20a of the protector body 20, and are juxtaposed at generally equal intervals. The single wire harness 40 can be easily and rapidly formed by the use of the protector 2.

The protector body 20 (FIG. 3A) and the cover 30 (FIG. 1) for being attached to this protector body 20 are made of the same metal material. The protector body 20 and the cover 30 are formed, using the metal material, and therefore the shielding characteristics of the protector 2 are further enhanced. The cover 30 is attached to the protector body 20 receiving the plurality of wires 41, 42 and 43 therein, and therefore the wires 41, 42 and 43 will not be separated from one another, and are positively kept in a bundled condition. The cover 30 is so shaped as to be attached to both of the protector body 10 (FIGS. 1 and 2A) and the protector body 20 (FIG. 3A).

As shown in FIG. 3A, a pair of slide portions 28 for sliding contact respectively with the pair of slide portions 38 (formed at the cover 30 (FIG. 1)) are formed at the protector body 20. The slide portions 38 of the cover 30 (FIG. 1) are fitted respectively on the slide portions 28 of the protector body 20, so that the cover 30 is slidably attached to the protector body 20.

The slide portions 28 are formed at the protector body 20, and therefore the cover 30 (FIG. 1) can be easily attached to the protector body 20 (FIG. 3A). The cover 30 is attached to the protector body 20, and therefore when disassembling the automobile (not shown) for recycling purposes, the protector 2 can be easily removed from the vehicle body of the automobile, and can be disassembled.

The elongate slide portions 28, formed respectively at the opposite side walls 22 and 23 of the protector body 20, extend in the direction of the length of the elongate protector body 20, and each of the slide portions 28 is formed as a convex portion 28 of a generally curved cross-section. The slide portions 28 of the above shape are formed at the protector body 20, and therefore the protector bodies 20 can be efficiently formed in a continuous manner by extrusion or the like at the time of producing the protector bodies 10.

The slide portions 28 are formed at the protector body 20, while the slide portions 38 (FIG. 1), corresponding respectively to the slide portions 28, are formed at the cover 30, and therefore the operation for attaching the cover 30 to the protector body 20 (FIG. 3A) can be effected easily. And besides, a seal between the protector body 20 (FIG. 3A) and the cover 30 is enhanced by the slide portions 28 of the protector body 20 and the slide portions 38 of the cover 30 (FIG. 1). Therefore, mud and sand are less liable to intrude into the protector 2.

The process of attaching the cover 30 (FIG. 1) to the protector body 20 will be described. One end portion 20e of the protector body 20 (FIG. 3A) and the other end portion of the cover 30 (FIG. 1) are mated with each other. The cover 30 is slid relative to the protector body 20 (FIG. 3A) in the longitudinal direction, and the protector body 20 and the cover 30 (FIG. 1) are fitted together in such a manner that the one end portion 20e of the protector body 20 (FIG. 3A) and the one end portion 30e of the cover 30 are disposed in a common plane, and by doing so, the cover 30 (FIG. 1) is attached to the protector body 20.

At this time, the inner surfaces 38f of the cross-sectionally-curved slide portions 38 (which extend respectively from the side walls 32 and 33 of the cover 30, and also extend in the longitudinal direction of the cover 30) slide in contact respectively with outer surfaces 28f of the cross-sectionally-curved slide portions 28 which extend respectively from the side walls 22 and 23 of the protector body 20 (FIG. 3A), and also extend in the longitudinal direction of the protector body 20. In this manner, the protector 2 is assembled.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. A protector, comprising:

a protector body, which has a receiving portion for receiving at least one wire, wherein a groove is formed on a bottom face of the receiving portion;

wherein the groove has a width smaller than a diameter of the wire, wherein a linear contact portion on which the wire is placed is formed on the bottom face; and wherein the linear contact portion linearly contacts the wire.

2. The protector as set forth in claim 1, wherein the protector body is comprised of a metal material.

3. The protector as set forth in claim 1, wherein the linear contact portions has a curbed shape.

4. The protector as set forth in claim 1, wherein the at least one wire is a plurality of wires which are bundled together to form a wire harness; and wherein the wires are received in the receiving portion of the protector body.

5. The protector as set forth in claim 1, further comprising a cover which is attached to the protector body, wherein the cover is comprised of a metal material.

6. The protector as set forth in claim 5, wherein the protector body has a first slide portion;

wherein the cover has a second slide portion which is situated so as to correspond to the first slide portion; and wherein when the cover is attached to the protector body, the cover is slidably movable to the protector body through the first and second slide portions.

7. The protector as set forth in claim 6, wherein the first slide portion has a convex portion, and extends in a longitudinal direction of the protector body; and wherein the second slide portion has a concave portion, and extends in a longitudinal direction of the cover.

8. The protector as set forth in claim 1, wherein the groove extends in a longitudinal direction of the protector body.

9. The protector as set forth in claim 1, wherein an external face of the protector body corresponding to the bottom face of the receiving portion has a corrugated shape.

10. A protector, comprising:

a protector body, which has a receiving portion for receiving at least one wire, the protector having a first slide portion; and a metallic cover which is attached to the protector body, the cover having a second slide portion situated to correspond to the first slide portion, wherein a groove is formed on a bottom face of the receiving portion, the groove having a width smaller than a diameter of the wire, and wherein when the cover is attached to the protector body, the cover is slidably movable with respect to the protector body through the first and second slide portions.

11. The protector as set forth in claim 10, wherein the first slide portion has a convex portion, and extends in a longitudinal direction of the protector body; and wherein the second slide portion has a concave portion, and extends in a longitudinal direction of the cover.

* * * * *